United States Patent
Laroia et al.

(10) Patent No.: US 6,816,736 B2
(45) Date of Patent: Nov. 9, 2004

(54) APPARATUS AND METHOD FOR USE IN PAGING MODE IN WIRELESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 500 days.

(21) Appl. No.: 09/756,066

(22) Filed: Jan. 8, 2001

(65) Prior Publication Data

US 2002/0090959 A1 Jul. 11, 2002

(51) Int. Cl.[7] .......................... H04Q 7/20; H04B 7/212
(52) U.S. Cl. ....................................... 455/458; 370/347
(58) Field of Search ................................. 455/458, 515; 370/347

(56) References Cited

U.S. PATENT DOCUMENTS

| | | | |
|---|---|---|---|
| 4,961,073 A | | 10/1990 | Drapac et al. |
| 5,146,214 A | * | 9/1992 | Yamada et al. |
| 5,604,744 A | * | 2/1997 | Andersson et al. ......... 370/347 |
| 5,905,965 A | | 5/1999 | Asano et al. |
| 5,991,635 A | | 11/1999 | Dent et al. |
| 6,029,061 A | | 2/2000 | Kohlschmidt |
| 6,058,289 A | | 5/2000 | Gardner et al. |
| 6,091,960 A | | 7/2000 | Raith et al. |
| 2002/0090959 A1 | * | 7/2002 | Larola et al. ............... 455/458 |

FOREIGN PATENT DOCUMENTS

| | | | |
|---|---|---|---|
| EP | 0 936 747 | | 8/1999 |
| JP | 02002223470 | * | 8/2003 |
| WO | WO 00/52948 | | 9/2000 |

OTHER PUBLICATIONS

European Search Report, dated: Mar. 19, 2002.

* cited by examiner

*Primary Examiner*—William Cumming

(57) ABSTRACT

In a unique paging time slot format, each of the allocated paging time slots occurs periodically and is split into several prescribed paging time slots including at least one first type paging time slot having a relatively short duration and at least one second type paging time slot having a longer duration. The at least one first type paging time slots is of relatively short duration and transports an indication whether a particular associated wireless terminal was paged. The second type paging time slot is of longer duration than the first type time slot and transports the entire paging message. Specifically, a wireless terminal that is normally in a standby mode only has to enter a monitor mode, i.e., "wake up", to monitor the relatively short first type paging time slot to determine whether it has been paged. If it has been paged, the wireless terminal then monitors the longer second type paging time slot to determine if it is transporting a valid paging message for the paged wireless terminal. If no valid paged indication is detected in the first type paging time slot or no valid paging message is detected in the second type paging time slot, the wireless terminal returns to the standby mode, i.e., returns to a "sleep" state, and waits for the next periodic occurrence of its assigned paging time slot.

28 Claims, 3 Drawing Sheets

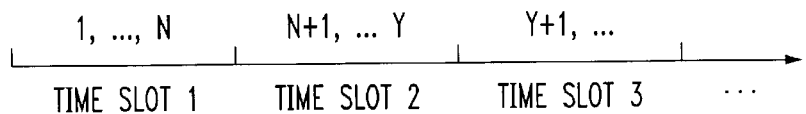
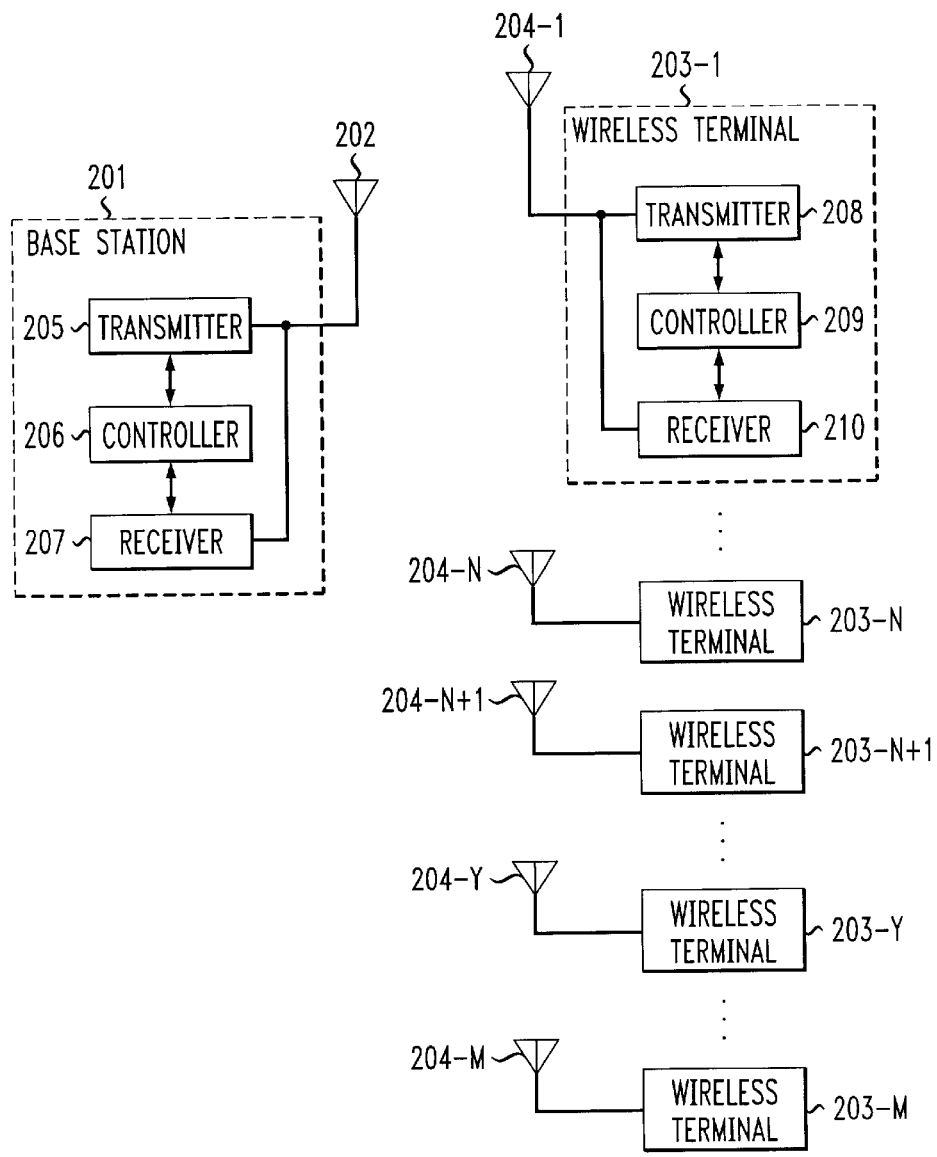

APPARATUS AND METHOD FOR USE IN PAGING MODE IN WIRELESS COMMUNICATIONS SYSTEMS

RELATED APPLICATIONS

U.S. patent applications Ser. No. (R. Laroia-J. Li-S. V. Uppala Case 26-18-11) and Ser. No. (R. Laroia-J. Li-S. V. Uppala Case 27-19-12) were filed concurrently herewith.

TECHNICAL FIELD

This invention relates to wireless communications systems and, more particularly, to wireless communications between wireless terminals and base stations.

BACKGROUND OF THE INVENTION

In wireless communications systems, wireless terminals (WTs) are paged, i.e., have special messages—so-called paging messages—sent to them, by associated base stations (BSs) to initiate communications. In order to realize this, the base stations typically have a channel on the downlink called the paging channel. In prior known paging arrangements, the paging channel is subdivided into a plurality of paging time slots. A group of wireless terminals is typically allocated a paging time slot of a prescribed periodicity for receiving paging messages from associated base stations. As shown in FIG. 1, wireless terminals 1 to N are allocated to time slot 1, wireless terminals N+1 to Y are allocated to time slot 2, and so on. Each wireless terminal is expected to monitor for paging messages from an associated base station during these paging time slots. To this end, the periodicity of the paging time slots is made sufficiently long that each of the wireless terminals can effectively turn off most of its circuitry between two of its designated paging time slots and, thus, save energy. This is referred to as the wireless terminal entering a so-called "sleep" mode. The wireless terminal, even though in the sleep mode, still has to keep track of the received paging time slots. The wireless terminal is caused to "wake up" prior to the arrival of its designated paging time slot, tunes to the downlink channel, and achieves carrier, timer and frame synchronization. Then, the wireless terminal decodes the paging time slot, and if its identifier is included in the wireless terminal's designated paging time slot, it knows that the paging message is meant for it. The wireless terminal then takes the appropriate action indicated in the paging message. If the paging message is not meant for the wireless terminal, it returns to the sleep mode, and monitors the next received paging time slot designated for it.

A disadvantage of this prior paging arrangement is that the wireless terminal has to decode the entire paging message in order to determine if the message is meant for it. When many wireless terminals share the paging time slot, it is quite likely that the paging message is not meant for that particular wireless terminal. This can cause the wireless terminal to expend power and reduce its battery life unnecessarily.

SUMMARY OF THE INVENTION

Problems and limitations of prior wireless paging arrangements are overcome by employing a unique paging time slot format. In the unique paging time slot format, each of the allocated paging time slots occurs periodically and is split into several prescribed paging time slots including at least one first type paging time slot having a relatively short duration and at least one second type paging time slot having a longer duration. The at least one first type paging time slots is of relatively short duration and transports an indication whether a particular associated wireless terminal was paged. The second type paging time slot is of longer duration than the first type time slot and transports the entire paging message.

Specifically, a wireless terminal that is normally in a standby mode only has to enter a monitor mode, i.e., "wake up", to monitor the relatively short first type paging time slot to determine whether it has been paged. If it has been paged, the wireless terminal then monitors the longer second type paging time slot to determine if it is transporting a valid paging message for the paged wireless terminal. If no valid paged indication is detected in the first type paging time slot or no valid paging message is detected in the second type paging time slot, the wireless terminal returns to the standby mode, i.e., returns to a "sleep" state, and waits for the next periodic occurrence of its assigned paging time slot.

A technical advantage of this unique two type time slot format is that only a small number of bits need to be decoded by the wireless terminal from its designated first type time slot to determine if the paging message in the second type time slot is meant for it. As a result, the wireless terminal does not have to perform as much "work" for paging messages not intended for it, and consequently conserves power and extends battery life.

BRIEF DESCRIPTION OF THE DRAWING

FIG. 1 is a graphic representation of a prior known paging time slot format;

FIG. 2 shows, in simplified block diagram form, details of a base station and a plurality of wireless terminals in which the invention may be employed;

DETAILED DESCRIPTION

Figure 3:
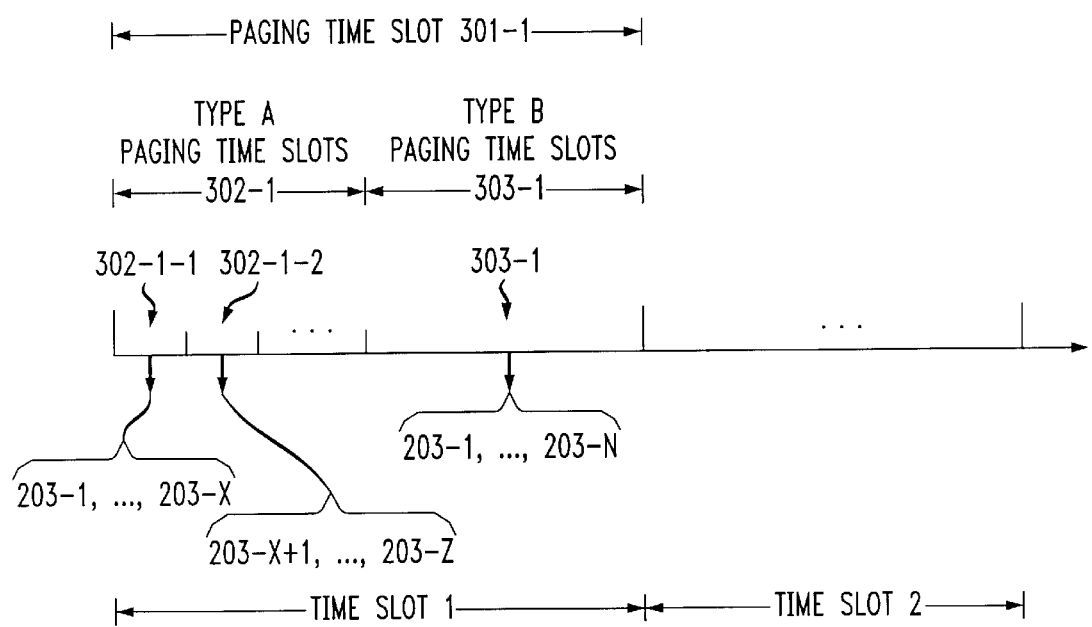
FIG. 3 graphically illustrates applicants' unique paging time slot format, in accordance with the invention.

FIG. 2 shows, in simplified block diagram form, a wireless multiple access communications system in which the invention may be advantageously employed. It should be noted that although applicants' unique invention will be described in the context of a mobile wireless communications system, it has equal application to non-mobile, e.g. fixed, wireless communications systems. One such mobile wireless communications system is the Orthogonal Frequency Division Multiplexed (OFDM) based spread spectrum multiple access system.

Specifically, shown in FIG. 2 is a multiple access wireless communications system 200. System 200 includes base station 201 including antenna 202 and one or more remote wireless terminals, i.e., wireless terminals 203-1 through 203-M including associated antennas 204-1 through 204-M, respectively. Transmission of signals is from and to base station 201, to and from remote wireless terminals 203. All of wireless terminals 203 share the transmission spectrum in a dynamic fashion.

In this example, base station 201 includes transmitter 205, receiver 207 and controller 206 for transmitting and receiving wireless messages via antenna 202. Controller 206 is employed to control operation of transmitter 205 and receiver 207, in accordance with the invention. Similarly, in this example, each of wireless terminals 203-1 through 203-M includes transmitter 208, receiver 210 and controller 209 for transmitting and receiving wireless messages via antenna 204. Controller 209 is employed to control operation of transmitter 208 and receiver 210, in accordance with the invention.

In accordance with the invention, base station 201 generates and transmits paging messages in applicants' unique format shown in FIG. 3 and described below to wireless terminals 203. Typically, wireless terminals 203 when not in use are in a standby mode commonly referred to as a "sleep" mode. In the sleep mode, most of the circuitry in the wireless terminals 203 is turned off in order to conserve energy and, thereby, extend battery life. In order for each of the wireless terminals 203 to detect whether there is a paging message intended for it, the particular wireless terminal 203 must come out of the sleep mode, i.e., wake up, and monitor its incoming dedicated periodically occurring time slots for an indication that a paging message has been received for the particular wireless terminal 203, as described below in relationship to FIG. 3.

FIG. 3 graphically illustrates applicants' unique paging time slot format. The format includes a plurality of periodically occurring paging time slots each including at least one relatively short first type paging time slot, referred to as a type "A" paging time slot, that transports an indication whether an associated wireless terminal has been paged and a second type paging time slot, referred to as a type "B" paging time slot, that transports an entire paging message for a particular paged wireless terminal 203, in accordance with the invention. Shown in FIG. 3 is paging time slot 301-1 that is divided, in this example, into type A paging time slots 302-1 and a type B paging time slot 303-1. The type A paging time slots include relatively short duration time slots 302-1-1, 302-1-2, etc. that transport only an indication of whether an assigned wireless terminal 203 has been paged, while type B paging time slot 303-1 includes the complete paging message for the paged wireless terminals 203 that are indicated as being paged in the type A paging time slots 302-1. Thus, in this example, type A paging time slot 302-1-1 has a subgroup including wireless terminals 203-1 through 203-X assigned to it, type A paging time slot 302-1-2 has a subgroup including wireless terminals 203-X+1 through 203-Z assigned to it and so on through wireless terminal 203-N. Also, in this example, type B paging time slot 303-1 transports the complete paging messages for assigned wireless terminals 203-1 through 203-N. The remaining ones of wireless terminals 203 are assigned to other periodically occurring paging time slots in the format.

Thus, wireless terminal 203-1 only decodes its assigned type A paging time slot 302-1-1 to determine whether there is a received paging message for it. Since the type A type paging time slot only transports relatively few bits of information as compared to the complete paging message transported by the type B paging time slot, it is relatively easy to decode. It should be noted that the number of bits used for a type A paging time slot is dependent on the number of wireless terminals assigned to each type A time slot and is left to the implementer. Consequently, there is a significant computational saving in the monitoring process for determining whether or not a particular wireless terminal has been paged with a corresponding saving in battery energy expended.

Figure 4:
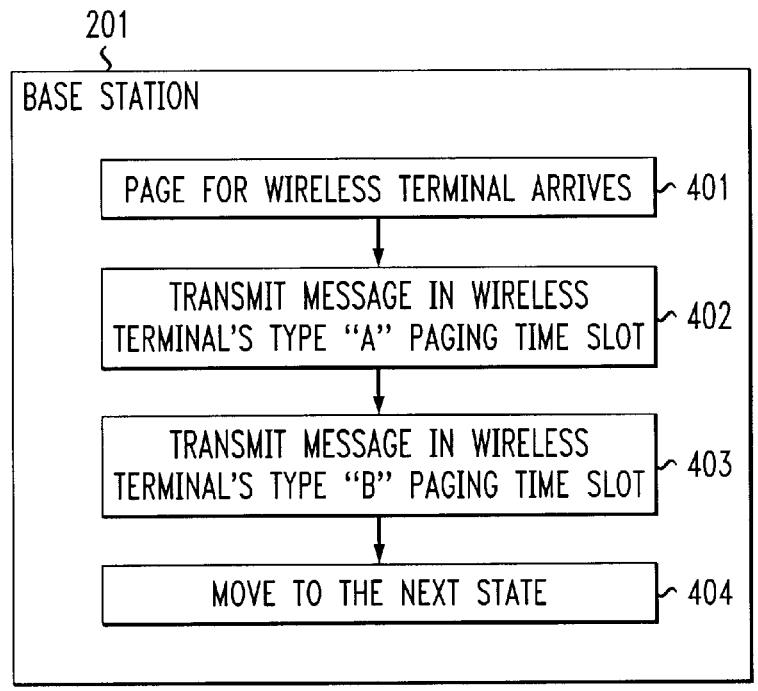
FIG. 4 is a flow chart illustrating the steps in the process of a base station transmitting paging messages.

FIG. 4 is a flow chart illustrating the steps in the process of a base station 201 transmitting a paging message for a particular wireless terminal 203 using applicants' unique format. In step 401 a page indication for a particular wireless terminal 203 arrives. Step 402 causes an indication that the particular wireless terminal 203, for example 203-1, has been paged to be transmitted in the assigned type A paging time slot, in this example, type A paging time slot 302-1-1. Then, in step 403, a paging message is caused to be transmitted in a type B paging time slot 303-1 associated with type A paging time slot 203-1. Finally, in step 404 base station 201 moves to the next state in the paging operation or the transmitting and receiving operation of base station 201.

Figure 5:
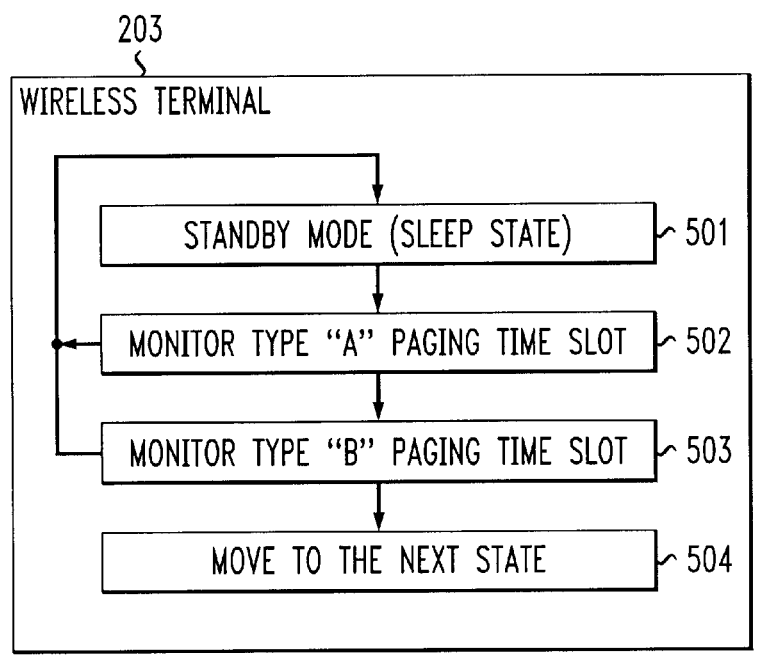
FIG. 5 is a flow chart illustrating the steps in the process of a wireless terminal processing the wireless terminal paging messages.

FIG. 5 is a flow chart illustrating the steps in the process of a wireless terminal 203 processing the wireless terminal paging messages. Initially, the wireless terminal 203, for example wireless terminal 203-1, is in the so-called sleep mode, i.e., standby mode, as indicated in step 501. In step 502, wireless terminal 203-1 periodically wakes up to monitor a type A paging time slot, in this example, 302-1-1, that is assigned to it in order to determine whether or not it has been paged. Note that only a few bits need to be decoded by wireless terminal 203-1 depending on the number of additional wireless terminals 203 that have been assigned to the type A paging time slot 302-1-1. If only one wireless terminal is assigned to each type A paging time slot 302-1 then a simple logical 1 or logical 0 only need be transported, as will be apparent to those skilled in the art. If no valid message is detected in step 502, control is returned to step 501 and wireless terminal 203-1 returns to the sleep mode. If a valid message, i.e., an indication that wireless terminal 203-1 has been paged, is detected in step 502, step 503 causes the associated type B time slot 303-1 to be monitored. If no valid message for the paged wireless terminal 203-1 assigned to type A paging time slot 302-1-1 is detected in step 503 control is returned to step 501 and wireless terminal 203-1 returns to the sleep mode. If a valid message is detected in step 503 for wireless terminal 203-1, step 504 causes wireless terminal to move to its next step in the paging and/or receiving and transmitting process. For example, the wireless terminal 203-1 may execute any action set forth in the paging message. Again, it should be noted that if only one wireless terminal is assigned to a type A paging time slot 302 additional information may have to be included in the paging message transported in its associated type B paging time slot 303 in order to relate the message to the appropriate wireless terminal being paged.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method for use in a wireless terminal of a wireless communications system including at least one base station and one or more of said wireless terminals to receive paging messages comprising the step of:

periodically receiving paging time slots intended to transport paging messages to one or more of said wireless terminals, wherein each individual one of said one or more paging time slots includes one or more of first type paging time slots, and at least one associated second type paging time slot, each of said first type paging time slots including fewer bits than said associated second type paging time slot and being intended to transport an indication that a particular one of said one or more wireless terminals has been paged, and said associated second type paging time slot for transporting a complete paging message for a paged wireless terminal;

monitoring only said fewer bits of an assigned first type paging time slot in said paging time slot for an indication that said particular one of said one or more wireless terminals has been paged; and in response to detecting an indication that said particular one of said one or more wireless terminals has been paged, monitoring a second type paging time slot in said paging time slot, associated with said first type paging time slot transporting said detected indication, for said complete paging message for the paged wireless terminal.

2. The method as defined in claim 1 wherein said step of periodically receiving includes receiving in said paging time slots a plurality of said first type paging time slots associated with a particular second type paging time slot.

3. The method as defined in claim 1 wherein said step of periodically receiving includes receiving for each of said one or more first type paging time slots an assigned separate subgroup of wireless terminals.

4. The method as defined in claim 3 wherein said step of periodically receiving includes receiving each of said first type paging time slots transporting an indication of any particular one of said one or more wireless terminals in its assigned subgroup that has been paged.

5. The method as defined in claim 1 further including the steps of monitoring an assigned first type time slot for an indication that said particular one of said one or more wireless terminals has been paged and in response to detecting an indication that said particular one of said one or more wireless terminals has been paged monitoring a second type paging time slot associated with said first type paging time slot transporting said detected indication for a paging message for the paged wireless terminal.

6. The method as defined in claim 1 wherein said particular one of said one or more of said wireless terminals is initially in a standby mode and further including a step of entering a monitoring mode prior to receiving said paging time slot including said first type paging time slot assigned to said particular one of said one or more of said wireless terminals.

7. The method as defined in claim 6 further including the steps of monitoring said assigned first type time slot for an indication that said particular one of said one or more wireless terminals has been paged and in response to detecting an indication that said particular one of said one or more of said wireless terminals has been paged monitoring a second type paging time slot associated with said first type paging time slot transporting said detected indication for a paging message for the paged wireless terminal.

8. The method as defined in claim 6 further including the steps of monitoring said assigned first type time slot for an indication that said particular one of said one or more wireless terminals has been paged and in response to not detecting an indication that said particular one of said one or more wireless terminals has been paged, returning to said standby mode.

9. The method as defined in claim 6 further including the steps of monitoring said assigned first type time slot for an indication that said particular one of said one or more wireless terminals has been paged and in response to detecting an indication that said particular one of said one or more wireless terminals has been paged, monitoring a second type paging time slot associated with said first type paging time slot transporting said detected indication for a paging message for the paged wireless terminal.

10. The method as defined in claim 9 further including a step of in response to not detecting a paging message for said particular one of said one or more wireless terminals in said second type paging time slot, returning to said standby mode.

11. The method as defined in claim 9 further including the step of in response to detecting a paging message for said particular one of said one or more wireless terminals in said associated second type paging time slot, entering an operation state indicated by the detected paging message.

12. The method as defined in claim 1 further including said at least one base station for use in said wireless communications system including said at least one base station and said one or more of said wireless terminals to transmit paging messages comprising the steps of:

in said at least one base station generating a paging time slot format including one or more periodically recurring paging time slots associated with one or more of said wireless terminals, wherein each of said one or more paging time slots includes one or more of first type time slots, and at least one associate second type time slot, each of said first type paging time slots in said paging time slot including fewer bits than said associated second type time slot and being intended to transport an indication that a particular one of said one or more wireless terminals has been paged and said associated second type time slot in said paging time slot for transporting a paging message for a paged wireless terminal; and transmitting one or more paging messages in said paging time slot format including said one or more periodically recurring paging time slots associated with one or more of said wireless terminals.

13. The method as defined in claim 12 wherein said at least one wireless terminal is initially in a standby mode and further including a step of entering a monitoring mode prior to receiving said paging time slot including said first type paging time slot assigned to said at least one wireless terminal.

14. Apparatus for a wireless terminal of a wireless communications system including at least one base station and one or more of said wireless terminals to receive paging messages comprising:

a receiver for periodically receiving paging time slots intended to transport paging messages to said one or more of said wireless terminals, wherein each individual one of said one or more paging time slots includes one or more of first type paging time slots, and at least one associated second type paging time slot, each of said first type paging time slots including fewer bits than said associated second type paging time slot and being intended to transport an indication that a particular one of said one or more wireless terminals has been paged and said associated second type paging time slot for transporting a complete paging message for a paged wireless terminal;

a first monitor for monitoring only said fewer bits of an assigned first type paging time slot in said paging time slot for an indication that said particular one of said one or more wireless terminals has been paged; and a second monitor, responsive to said detection of an indication that said particular one of said one or more wireless terminals has been paged, to monitor a second type paging time slot in said paging time slot, associated with said first type paging time slot transporting said detected indication, for said complete paging message for the paged wireless terminal.

15. The apparatus as defined in claim 14 wherein a plurality of said first type paging time slots is associated with a particular second type paging time slot.

16. The apparatus as defined in claim 14 wherein a separate subgroup of wireless terminals is assigned to each of said one or more first type paging time slots.

17. The apparatus as defined in claim 16 wherein each of said first type paging time slots is intended to transport an indication of any particular wireless terminal in its assigned subgroup that has been paged.

18. The apparatus as defined in claim 14 wherein said receiver monitors an assigned first type time slot for an indication that a particular one of said one or more wireless terminals has been paged and in response to detecting an indication that said particular one of said one or more wireless terminals has been paged, said receiver monitors a second type paging time slot associated with said first type paging time slot transporting said detected indication for a paging message for the paged wireless terminal.

19. The apparatus as defined in claim 14 wherein said particular one of said one or more wireless terminals is initially in a standby mode and is controlled to enter a monitoring mode prior to receiving said paging time slot including said first type paging time slot assigned to said particular one of said one or more wireless terminals.

20. The apparatus as defined in claim 19 wherein in said monitoring mode, said receiver is controlled to monitor said assigned first type time slot for an indication that said particular one of said one or more wireless terminals has been paged and in response to detecting an indication that said particular one of said one or more wireless terminals has been paged, said receiver is controlled to monitor a second type paging time slot associated with said first type paging time slot transporting said detected indication for a paging message for the paged wireless terminal.

21. The apparatus as defined in claim 19 wherein in said monitoring mode, said receiver is controlled to monitor said assigned first type time slot for an indication that said particular one of said one or more wireless terminals has been paged and in response to not detecting an indication that said particular one of said one or more wireless terminals has been paged, said particular one wireless terminal is controlled to return to said standby mode.

22. The apparatus as defined in claim 19 wherein in said monitoring mode, said receiver is controlled to monitor said assigned first type time slot for an indication that said particular one of said one or more wireless terminals has been paged, and in response to detecting an indication that said particular one or more of said wireless terminals has been paged, said receiver is controlled to monitor a second type paging time slot associated with said first type paging time slot transporting said detected indication for a paging message for the paged wireless terminal.

23. The apparatus as defined in claim 22 wherein said particular one wireless terminal, in response to not detecting a paging message for said particular one wireless terminal in said second type paging time slot, is controlled to return to said standby mode.

24. The apparatus as defined in claim 22 wherein said wireless terminal, in response to detecting a paging message for said particular one of said one or more wireless terminals in said associated second type paging time slot, is controlled to enter an operational state indicated by the detected paging message.

25. The wireless communications system as defined in claim 14 including said at least one base station and said one or more of said wireless terminals to transmit paging messages comprising:

in said at least one base station a generator for generating a paging time slot format including one or more periodically recurring paging time slots to transmit paging messages to one or more of said one or more wireless terminals, wherein each individual one of said one or more paging time slots includes one or more of first type paging time slots, and at least one associated second type paging time slot, each of said first type paging time slots including fewer bits than said associated second type paging time slot and being intended to transport an indication that said particular one of said one or more wireless terminals has been paged and said associated second type paging time slot for transporting a complete paging message for a paged wireless terminal, and a transmitter for transmitting said paging time slot format to said one or more wireless terminals.

26. The system as defined in claim 25 wherein said at least one wireless terminal is initially in a standby mode and further including said particular one of said one or more wireless terminals being controlled to enter a monitoring mode prior to receiving said paging time slot including said first type paging time slot assigned to said at least one wireless terminal.

27. Apparatus for a wireless terminal of a wireless communications system including at least one base station and one or more wireless terminals to receive paging messages comprising:

means for periodically receiving paging time slots intended to transport paging messages to one or more wireless terminals, wherein each individual one of said one or more paging time slots includes one or more of first type paging time slots, and at least one associated second type paging time slot, each of said first type paging time slots including fewer bits than said second type paging time slot and being intended to transport an indication that a particular one of said one or more particular wireless terminals has been paged and said associated second type paging time slot for transporting a complete paging message for a paged wireless terminal;

means for monitoring only said fewer bits of an assigned first type paging time slot in said paging time slot for an indication that said particular one of said one or more wireless terminals has been paged; and said means for monitoring being responsive to detection of an indication that said particular one of said one or more wireless terminals has been paged, for monitoring a second type paging time slot in said paging time slot, associated with said first type paging time slot transporting said detected indication, for said complete paging message for the paged wireless terminal.

28. The wireless communications system as defined in claim 27 including said at least one base station and said one or more wireless terminals to transmit paging messages comprising:

in at least one base station means for generating a paging time slot format including one or more periodically recurring paging time slots to transmit paging messages to said one or more wireless terminals, wherein each individual one of said one or more paging time slots includes one or more of first type paging time slots, and at least one associated second type paging time slot, each of said first type paging time slots including fewer bits than said second type paging time slot and being intended to transport an indication said particular one of said one or more wireless terminals has been paged and said associated second type paging time slot for transporting a paging message for a paged wireless terminal, and means for transmitting said paging time slot format to said one or more wireless terminals.

* * * * *